Sept. 26, 1967     C. L. CAROLAN     3,343,345
COVER MEANS FOR FRYING PANS AND THE LIKE
Filed Feb. 15, 1965

INVENTOR
Claire L. Carolan

BY *Lawrence J. Winter*

ATTORNEY

United States Patent Office 3,343,345
Patented Sept. 26, 1967

3,343,345
COVER MEANS FOR FRYING PANS AND
THE LIKE
Claire L. Carolan, 1 Adelaide St.,
Belleville, N.J. 07109
Filed Feb. 15, 1965, Ser. No. 432,455
1 Claim. (Cl. 55—384)

The present invention relates to cover means for a frying pan and the like, and more particularly to a cover that is utilized to permit the gases and vapors to be discharged from the interior of the pan or structure that is covered while at the same time preventing the escape of any grease.

It is an object of the present invention to provide a lid or cover that is self-supporting and which provides a circuitous flow path for gases that escape from a frying pan and the like while preventing any splattering or splashing out from the pan of grease due to the fact that the cover does not provide an opening on the inner surface thereof in alignment with an opening on the outer surface thereof so that the grease can be discharged therefrom.

It is yet another object of the present invention to provide a lid or cover for a frying pan and the like that is made of foraminous material of a predetermined depth so that the foraminous mass will filter out any grease from the pan while letting steam given off during cooking to escape from the pan.

It is yet another object of the present invention to provide a novel depth type filter mass or pack that is non-transparent so that only gases can escape from the frying pan while any liquid material such as grease and the like cannot be discharged or splashed through the mass.

It is another object of the present invention to provide a compact and simple and economical lid structure for a frying pan and the like that can be made from conventional material so as to reduce the cost thereof and which will permit the escape of vapors from the pan during cooking but which will prevent the discharge from the pan of liquid materials such as grease and the like to inadvertently injure the person during the cooking or to contaminate the stove, to thereby reduce the necessity for cleaning the cooking apparatus.

Various other objects and advantages of the present invention will be readily apparent from the following detailed description when considered in connection with the accompanying drawing forming a part hereof and in which.

Figure 1:
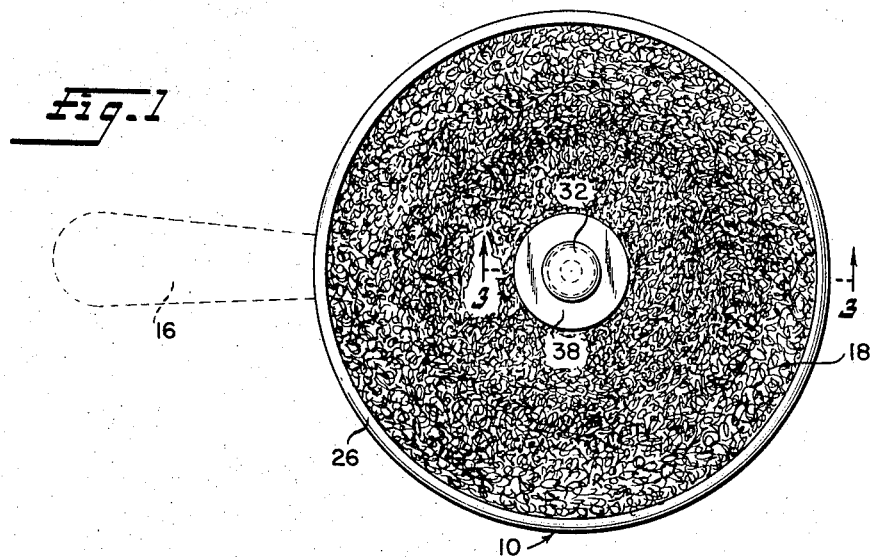
FIGURE 1 is a plan view of the present invention.
Figure 2:
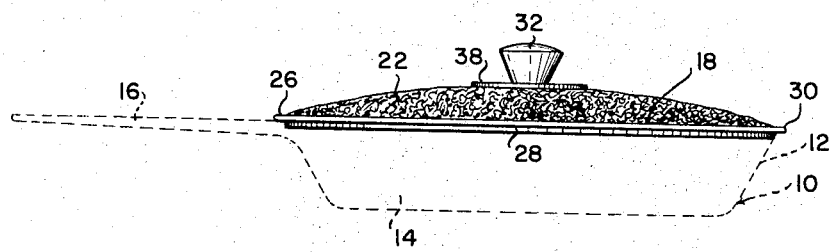
FIGURE 2 is a side elevational view of the invention, illustrating the cover means disposed on a frying pan.
Figure 3:
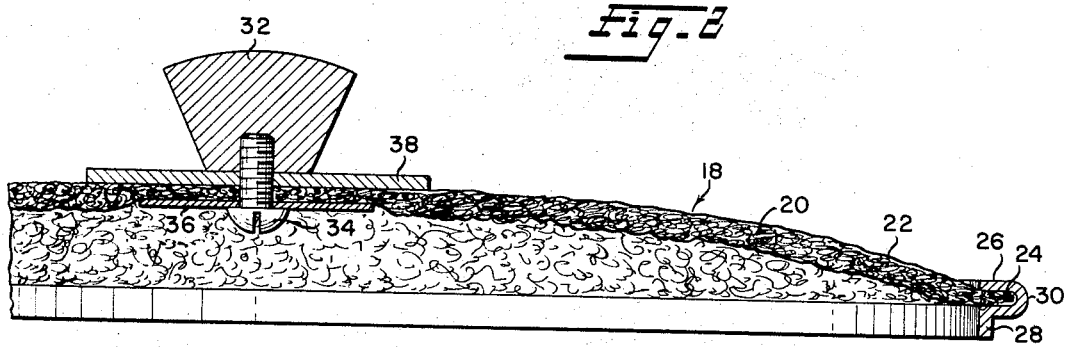
FIGURE 3 is an enlarged detail view taken along the line 3—3 of FIGURE 1.

Referring to the drawings, the reference numeral 10 generally designates a frying pan or frying dish and the like having an upstanding circular wall 12 flared upwardly and outwardly and a circular bottom 14. The pan is also provided with the usual horizontally extending handle 16 adjacent the upper edge of the side wall 12.

The cover means or lid of the present invention is designated 18 and is made of steel wool, which steel wool forms a pack or filter mass having a predetermined depth in cross-section, for example approximately one quarter of an inch in depth so as to provide a circuitous path therethrough from its inner surface 20 to its outer surface 22 so that there are no openings through the lid on the surface 20 and 22 in alignment with each other to permit the escape of liquid material such as grease and the like. The steel wool mass is of course made of non-corrosive material and is preferably self-supporting. The lid is dome-shaped and has a height of approximately one and one-half inches. The circumferential portion 24 of the lid is substantially horizontally disposed and is provided with a rolled metal bead 26 crimped thereover so as to clamp the portion 24 therebetween. The rolled bead 26 is further provided adjacent its lower side with a substantially vertically extending rim 28 which rim is disposed inwardly of the generally U-shaped curved section 30 of the bead so that the lid can readily be seated around the edge of a frying dish or pan.

The central portion of the lid 18 is provided with a preferably Bakelite or similar material plastic handle 32 secured to the lid 18 by a screw member 34. The screw member 34 has mounted thereon a washer 36 and a larger circular washer 38 on the opposite sides of the lid 18. The washers 36 and 38 extend over an area of the lid 18 so that the lifting force applied to the handle 32 when the lid is removed from the pan will be uniformly distributed over a predetermined area of the lid 18 so that it will not cause undue wear of the steel wool lid adjacent the handle.

If desired, the steel wool could be supported by any suitable means, such as arcuate spaced bars or rods; however it is preferred that the steel wool be of sufficient thickness so as to be self-supporting.

From the foregoing description it is apparent that the present invention provides a novel, improved foraminous depth type steel wool mass that is opaque and non-transparent and which provides a circuitous path that will permit the escape of vapors from the frying pan during the cooking operation but which will not permit the escape of liquid material such as grease and the like since the liquid material cannot follow a circuitous or indirect flow path through the steel wool mass, and hence will impinge upon the steel wool and be filtered out of the escaping vapors.

The present invention further provides an economical and simple lid or cover means for frying pans that can be made from conventional material readily available.

The present invention further provides a splatter-proof frying pan or frying dish and cover therefor which eliminates the necessity for cleaning the stove or cooking apparatus since there is no need to tilt the cover on the pan to permit the gases to escape therefrom, and hence there is no opening through which the liquid grease can escape from the frying pan during the cooking operation.

Inasmuch as changes may be made in the form, location and relative arrangement of the several parts of the invention without departing from the principle of the invention, it will be understood that the invention is not to be limited except by the scope of the appended claim.

What is claimed is:

A frying pan lid for covering a cooking utensil comprising a circular disk type member having a substantially horizontal peripheral portion and a central portion extending upwardly from said peripheral portion to form an overall dome-shaped lid, said peripheral portion and central portion being made from a single rigid mass of self-supporting steel wool material to provide a circular frying pan lid substantially completely foraminous throughout its entire area, the thickness of said steel wool mass being of such dimension to provide an opaque and non-transparent frying pan lid which permits vapors to pass therethrough throughout its entire area, while preventing passing of liquid and droplets therethrough, a bead secured to said peripheral portion, said bead consisting af a U-shaped section and a substantially vertically extending rim disposed inwardly of said U-shaped section to seat the lid on the pan, and central handle means secured to the upper central dome portion.

References Cited

UNITED STATES PATENTS

| | | | |
|---|---|---|---|
| 1,942,900 | 1/1934 | Peters | 55—384 X |
| 2,402,140 | 6/1946 | Heintzelman | 55—419 X |
| 2,498,534 | 2/1950 | Drum | 99—347 X |
| 2,524,554 | 10/1950 | White | 55—384 |
| 2,568,637 | 9/1951 | Jardim | 220—44 X |
| 2,715,453 | 8/1955 | Lange. | |
| 2,770,389 | 11/1956 | Drakoff | 220—44 X |
| 2,999,559 | 9/1961 | Boyer | 220—44 X |
| 3,017,698 | 1/1962 | Hambrecht et al. | |

OTHER REFERENCES

Advertising Circular, "Products of Research by Research Products Corporation, Madison 1, Wis.," Form 1509, Rev. Oct. 1, 1963, 2 pages.

HARRY B. THORNTON, *Primary Examiner.*

ROBERT F. BURNETT, *Examiner.*

S. W. SOKOLOFF, *Assistant Examiner.*